(No Model.)
L. A. SMITH.
DOOR HANGER.
No. 286,085. Patented Oct. 2, 1883.
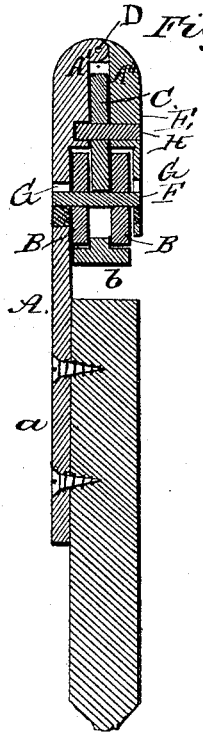
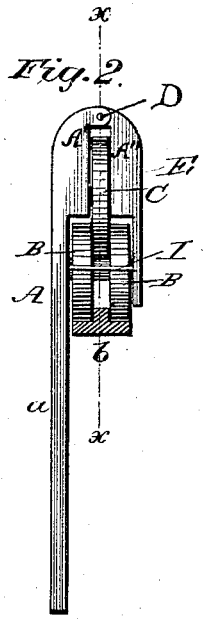
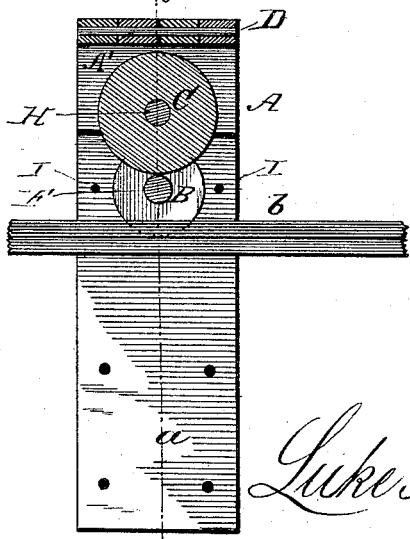
WITNESSES:
Fred G. Dieterich
Arthur L. Morsell
Luke A. Smith,
INVENTOR.
By Louis Bagger & Co.
ATTORNEYS.

UNITED STATES PATENT OFFICE.

LUKE A. SMITH, OF LUDINGTON, MICHIGAN.

DOOR-HANGER.

SPECIFICATION forming part of Letters Patent No. 286,085, dated October 2, 1883.

Application filed July 20, 1883. (No model.)

*To all whom it may concern:*

Be it known that I, LUKE A. SMITH, a citizen of the United States, and a resident of Ludington, in the county of Mason and State of Michigan, have invented certain new and useful Improvements in Roller-Bearings for Sliding Doors; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section of my invention through line $yy$ in Fig. 3. Fig. 2 is an end view of the same, and Fig. 3 is a sectional view through line $xx$ in Fig. 2.

My invention has relation to that class of hangers for sliding doors in which two rollers fastened upon a common axle roll upon a rail at the upper end of a door-frame, said axle being journaled in slots in the sides of a hanger-frame straddling said rail, and in which the portion of the axle between the rollers bears against the periphery of a third roller journaled in the frame above the lower rollers; and it consists in the improved construction and combination of parts of the frame, having a hinge at its upper end, whereby one side of the frame may be swung out for the purpose of removing the rollers, as hereinafter more fully described and claimed.

In the accompanying drawings, the letter A indicates a flat bar adapted to be fastened with its lower portion, $a$, to a door, and having its upper portion provided with transverse perforated lugs A', forming a portion of a pintle-hinge, the remainder of which is formed by transversely-perforated lugs A'' upon the upper end of a bar, E, shaped similar to the upper portion of bar A, and a pintle, D, passing through the intermeshing lugs and hinging the two bars or bracket-sections together. Two pulleys or rollers, B B, are secured, with a short distance between them, upon a shaft or axle, F, turning in longitudinal slots G in the lower end of bar E and in the corresponding portion of bar A, and a roller, C, bears with its rim against the space between the rollers B, and is fastened upon an axle, H, turning in bearings in the upper portions of the bracket portions. The lower rollers travel upon a rail, $b$, secured at the upper end of the door-frame, and two removable bolts or screws, I, passing through the lower ends of both the bracket portions, serve to connect the said ends, preventing the bracket portions from swinging apart.

It will be seen that when it is desired to remove one or all of the rollers, the bolts or screws may be removed, the loose bracket portion swung out, and the rollers removed and others put in their place, or whatever manipulation of the rollers is desired may be done.

I am aware that door-hangers having two rollers traveling upon a rail and fastened upon a common axle, and having a third anti-friction roller bearing with its periphery against the shaft of the two rollers, have been made before, and I do not wish to claim such construction; but

What I claim, and desire to secure by Letters Patent of the United States, is—

A hanger for sliding doors, having rollers traveling upon a rail at its lower portion, an anti-friction roller journaled in its upper end, and having a hinged frame, one portion of which is fastened to the upper end of the door, forming a hinge at its upper end, having the rollers journaled between the two hinged bracket-sections, and having the said bracket-sections secured together at their lower ends by means of screws or bolts, as and for the purpose shown and set forth.

In testimony that I claim the foregoing as my own I have hereunto affixed my signature in presence of two witnesses.

LUKE ALBERT SMITH.

Witnesses:
 JNO. S. WOODRUFF,
 WILLIAM FOY.